United States Patent

Irvin

[11] Patent Number: 6,029,074
[45] Date of Patent: *Feb. 22, 2000

[54] HAND-HELD CELLULAR TELEPHONE WITH POWER MANAGEMENT FEATURES

[75] Inventor: David Rand Irvin, Raleigh, N.C.

[73] Assignee: Ericsson, Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/850,913

[22] Filed: May 2, 1997

[51] Int. Cl.[7] ....................................................... H04B 1/40
[52] U.S. Cl. .......................... 455/571; 455/69; 455/127; 455/522
[58] Field of Search ............................... 455/522, 69, 569, 455/571, 572, 573, 574, 115, 116, 126, 127

[56] References Cited

U.S. PATENT DOCUMENTS

| | | |
|---|---|---|
| 4,636,741 | 1/1987 | Mitzlaff . |
| 4,709,404 | 11/1987 | Tamura et al. ........................... 455/126 |
| 5,146,614 | 9/1992 | Furuno ..................................... 455/571 |
| 5,303,395 | 4/1994 | Dayani ..................................... 455/127 |
| 5,457,814 | 10/1995 | Myrskog et al. . |
| 5,497,507 | 3/1996 | Komaki . |

FOREIGN PATENT DOCUMENTS

| | | |
|---|---|---|
| 0 331 435 A2 | of 1989 | Japan . |
| WO 93/01659 | of 1993 | WIPO . |
| WO 96/34461 | of 1996 | WIPO . |

OTHER PUBLICATIONS

Pratt, Richard E. and Fitzgibbons, Thomas; "RF Power Configuration Method for Battery Equipped Portable Radios;" Motorola; vol. 24; Mar. 1995; pp. 75,77.

"The GSM System;" Radio Resource Management; 1993;pp. 342–346.

Primary Examiner—Lee Nguyen
Attorney, Agent, or Firm—Coats & Bennett, PLLC

[57] ABSTRACT

A mobile terminal includes power control logic which limits the maximum transmit power of the mobile radio telephone to conserve battery power when it is operated in a hand-held mode. The mobile radio telephone includes power control logic which sets the transmit power in response to power control codes received from a base station. The power control codes transmitted from the base station correspond to designated power levels. A signal is generated to indicate whether the mobile radio telephone is operated in a hand-held mode. When the mobile radio telephone is operated in a hand-held mode, the power control logic sets the power level at a maximum hand-held power level which is less than the maximum transmit power level.

9 Claims, 6 Drawing Sheets

HAND-HELD CELLULAR TELEPHONE WITH POWER MANAGEMENT FEATURES

FIELD OF THE INVENTION

The present invention relates generally to the field of mobile radio communication devices and more particularly to a method and apparatus for controlling the transmit power level in a mobile communication device.

BACKGROUND

The range of a radio communication link, for example the radio link used to connect a hand-held cellular telephone to a cellular base station, depends on a number of factors. Among these are receiver sensitivity at the base station, antenna gain at the receiver and transmitter, path loss, and RF transmitter power at the hand-held terminal. In general, a more powerful hand-held terminal will have greater capability to provide service within shielding structures such as buildings and to sustain conversations deeper into fringe areas.

Nevertheless, the advantages of having a powerful terminal are counterbalanced by a number of practical considerations that limit the amount of power usefully disposed to a hand-held terminal. Primary among these considerations are the need to conserve the draw of electrical energy from the terminal's small rechargeable battery, and the need to throttle power to the lowest useable level so as to avoid interference with other radio links active at the same time.

Under certain conditions, however, the need to limit power is relaxed, for example or when the cellular terminal is used in a home docking station to provide data, voice, or security-system-backup communications, or when the cellular terminal is operated with a hands-free cradle in a motor vehicle. In these and similar applications, the docking station or cradle makes external power available, often by way of an integral battery charger, thereby easing the battery-draw constraint. In both cases, however, the need remains to throttle power as appropriate to avoid unnecessary interference.

In order to minimize interference, a cellular base station measures the strength of the incoming signal it receives from the mobile unit, and instructs the mobile unit to adjust its radiated power to the lowest level adequate to sustain good quality communications. This enables the mobile station to maintain communications as it moves about and experiences variations in path loss. The power adjustments ordered by the base station must, of course, fall within the capability of the terminal to supply RF power, and must further fall within the practical constraints of energy draw.

Within the accepted industry standards for cellular telephones, terminal power is generally categorized by class. For example, a terminal designed for operation with a GSM system falls into one of five classes, where those classes have maximum peak power-output limits ranging from 20 Watts (Class 1) to 0.8 Watts (Class 5), and where the power adjustments commanded by the base station take place over 15 steps of 2 decibels (dB) each. Within the AMPS system used in North America and elsewhere, three classes are used which have a maximum transmit power of 6 dbW (Class 1), 2 dbW (Class 2), and −2 dbW (Class 3). Because of battery limitations, handheld terminals ordinarily operate as Class-3 devices. This unfavorably limits their capability to provide good quality service within buildings and in deep-fringe areas. To overcome such limitations when hand-held terminals are used with hands-free accessory cradles in motor vehicles, the prior art teaches three solutions to maximizing power generally within the aforementioned constraints on energy draw and interference. These solutions are called here the external booster, the high-powered terminal, and the power-exception terminal.

The external booster provides a second (external to the terminal) RF power amplifier and associated control circuitry as part of the hands-free cradle. When the hand-held terminal is captured by the cradle, its presence activates the second power amplifier (PA), which is inserted between the hand-held terminal and an external antenna. In practice, the power output level of the hand-held terminal itself is sometimes reduced upon insertion into the cradle so as not to overdrive the second PA. Together, the handheld terminal and the external booster work as a Class-I device within the cellular system. The second PA boosts the maximum RF power output typically to 3.0 Watts, thereby providing about 7 dB advantage over a 0.6 Watt hand-held terminal in deep fringe operation. In order to provide this advantage, however, the mobile unit incurs considerable expense, bulk, complexity, and duplication of resources. For example, U.S. Pat. No. 5,457,814, "Power boost system for cellular telephone," describes an external booster comprising two duplexers, an RF power amplifier, a fault detector, automatic-power control circuitry, and pulse-width modulation circuitry that provides a way of communicating control information between the booster and the hand-held terminal.

The second solution proposed by the prior art, called here the high-powered terminal, is taught in U.S. Pat. No. 4,636,741, "Multi-level power amplifying circuitry for portable radio transceivers," wherein a hand-held unit with an internal high-power PA senses its own insertion into a vehicle cradle, increases its status from Class-3 to Class-1 (3 Watts in the preferred embodiment), and re-registers itself with the cellular system under Station Class Mark 1. However, this solution has several drawbacks, including the need for a higher DC supply voltage to sustain the high demands of the power amplifier (PA) when operating in Class-I service, the need for different construction to accommodate the thermal demands of Class-I operation not normally encountered in Class-3 operation, and the added complexity needed to change the Station Class Mark between Class-3 and Class-1. For these reasons, a later U.S. Pat. No. 5,457,814, teaches against the high-powered terminal of the type disclosed in 4,636,741, noting that the approach leads to "increased weight, bulk and cost, and greatly diminishes the amplifier reliability of the radiotelephone."

A third solution, called here the power-exception terminal, is disclosed in U.S. patent application Ser. No. 08/728,681 filed Oct. 9, 1996 titled "RF Gain Enhancement for Cellular Telephone." This application describes a cooperative relationship between a vehicle's cradle and a Class-3 hand-held terminal. Upon insertion into the cradle, the terminal increases its power to the maximum level it can sustain within Class-3 operation, and disables its power-control apparatus. Although this solution has the great virtue of simplicity, it provides no increase in transmitter power over that which the Class-3 terminal has inherently within its grasp, and it incurs the risk, although perhaps slight, of creating undue interference with other radio links whenever its power-control apparatus is disabled.

In view of the limitations of the prior art as described above, there remains a need for a simple, inexpensive hand-held terminal that provides increased transmitter power to give better service indoors or in fringe areas, wherein the increased transmitter power is enabled when the terminal is inserted into a docking station used to provide an RF link in support of a portable computer, or into a vehicle's hands-free cradle, and yet wherein the terminal operates within known constraints imposed by battery capacity used as a hand-held device.

SUMMARY OF THE INVENTION

The present invention provides a mobile radio telephone which includes power control logic to limit the maximum transmit power of the mobile telephone when it is operated in a hand-held mode. The transmit power of the mobile terminal is set in response to power control codes received from a base station. In the preferred embodiment, the power control codes are mobile attenuation codes which correspond to pre-defined power levels. The power levels include a maximum transmit power level and a plurality of lower power levels. When the mobile terminal is operated in a hand-held mode, one of the lower power levels is designated as the maximum hand-held transmit power level. Upon receipt of a mobile attenuation code from the base station, the mobile terminal determines whether the unit is operating in a hand-held mode, and if so, whether the mobile attenuation code calls for a power level greater than the maximum hand-held transmit power level. If both these conditions are met, the transmit power level is set equal to the maximum hand-held transmit power level. In all other cases, the transmit power level is set to the power level designated by the mobile attenuation code.

In other embodiments, the power levels associated with the various mobile attenuation codes are optionally reduced for hand-held use by menu-driven user input or in automatic response to signals that indicate low battery reserves in order to prolong battery life at the expense of transmission range.

DETAILED DESCRIPTION OF THE DRAWINGS

DESCRIPTION OF THE INVENTION

Figure 1:
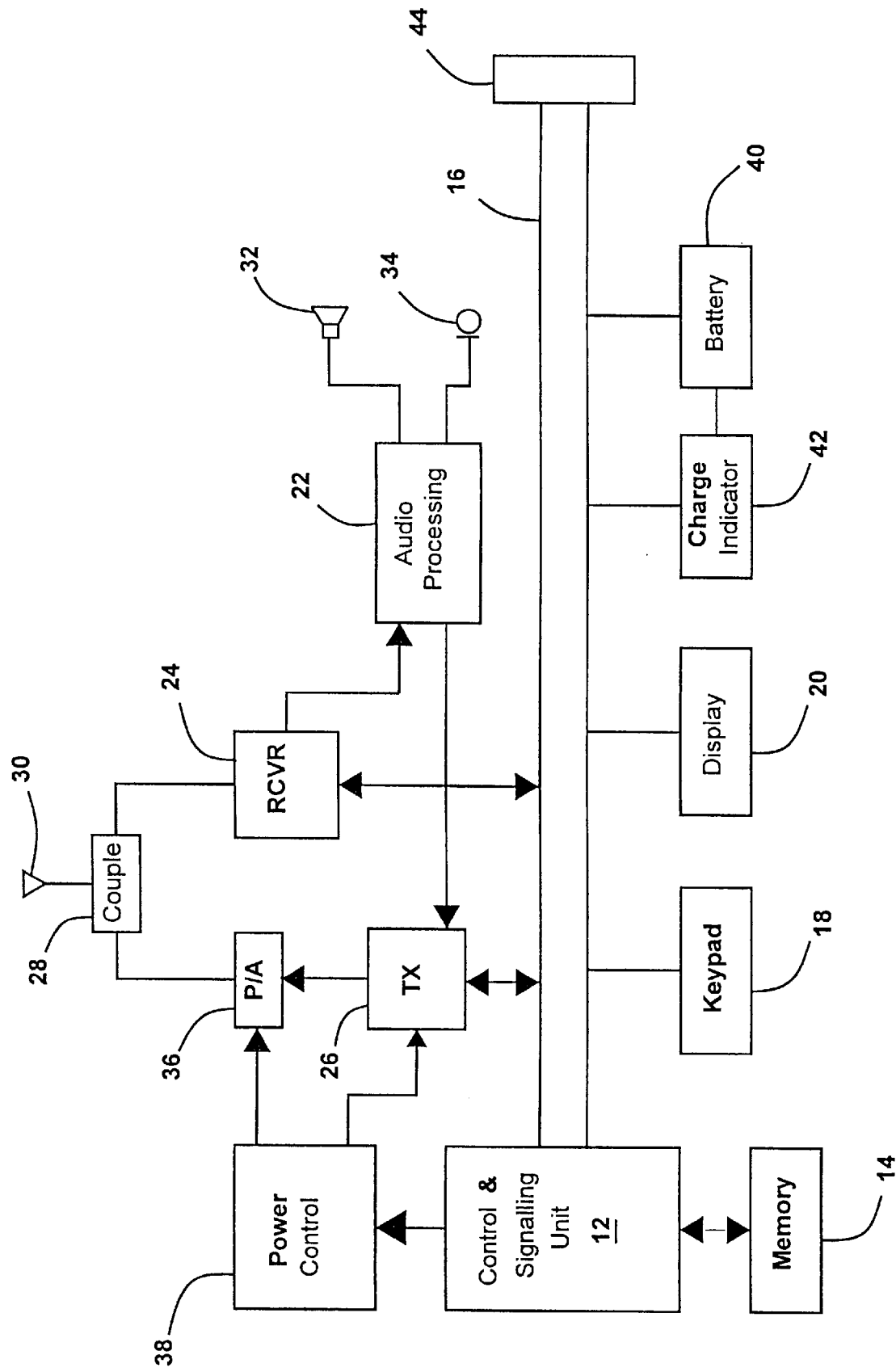
FIG. 1 is a block diagram of a mobile terminal according to the present invention.

Referring now to the drawings, an improved hand-held mobile terminal according to the present invention is shown. The hand-held mobile terminal 10 is a fully functional, battery powered, mobile transceiver capable of sending and receiving voice and/or data signals. The hand-held mobile terminal 10 may also be inserted into a cradle in a vehicle or connected to a docking station. The hand-held mobile terminal 10 of the present invention is a Class 2 AMPS radio telephone. It will be appreciated, however, that the invention might also be advantageously used in Class 1 or other devices.

The mobile terminal 10 includes a microprocessor 12 for controlling the operation of the mobile terminal 10 and a program memory 14 for storing programs used by the mobile terminal 10. The microprocessor 12 is interfaced by a system bus 16 with a keypad 18, display 20, audio processing circuits 22, receiver 24, and transmitter 26. The keypad 18 and display 20 provide a user interface. The receiver 24 and transmitter 26 are coupled to an antenna 30 by coupler 28 so as to permit fill duplex communication. The audio processing circuit 22 provides basic analog audio outputs to a speaker 34 and accepts analog audio inputs from a microphone 32. Received signals picked up by the antenna 30 are demodulated and decoded by the receiver 24. The transmitter 26 encodes and modulates signals passed to it by the audio processing circuits 22. The output of the transmitter 26 is amplified by a power amplifier 36 which is controlled by a power control unit 38. The power amplifier 36 and power control unit 38 determine the power level at which the signal is transmitted.

The control and signaling unit 12 performs most of the control functions of the radio telephone 10. One of these functions is power control. The control and signaling unit 12 controls the transmit power level of the mobile terminal 10 in accordance with commands received from the base station. In the AMPS system used in North America, there are a total of 8 power levels. The base station determines the appropriate power level for the mobile terminal 10 based on strength and quality measurements on the signal received from the mobile telephone 10. The base station sends power control signals to the mobile terminal 10. The power control signals are sent via the slow Associated Content Channel (SACCH) or the Fast Associated Control Channel (FACCH). The control and signaling unit 12 then sets the transmit power level of the mobile terminal 10 based on the signals received from the base station.

The power control signals transmitted by the base station to the mobile terminal 10 are in the form of a mobile attenuation code (MAC). Table 1 below sets forth the MAC and power associated with each power level in the AMPS system for Class I, II, and III devices.

| Power Level | MAC | Power For Class (in dbW) | | |
| --- | --- | --- | --- | --- |
| | | Class I | Class II | Class III |
| 0 | 000 | 6 | 2 | −2 |
| 1 | 001 | 2 | 2 | −2 |
| 2 | 010 | −2 | −2 | −2 |
| 3 | 011 | −6 | −6 | −6 |
| 4 | 100 | −10 | −10 | −10 |
| 5 | 101 | −14 | −14 | −14 |
| 6 | 110 | −18 | −18 | −18 |
| 7 | 111 | −22 | −22 | −22 |

−2 dbW=0.631 Watts; 2 dbW=1.58 Watts; 6 dbW=3.98 Watts

When the mobile terminal 10 receives a power control signal from the base station, it sends instructions to the power control module 38 to adjust the transmit power accordingly. The power control module 38 includes a series of attenuators or other components for controlling the output of the power amplifier 36. The power amplifier 36 may be a single stage amplifier or a multiple-stage amplifier. If a multiple stage amplifier is used, the power control module 38 could include multiple bias adjustments and attenuators for controlling the output in each stage of the power amplifier 36. There are a wide variety of power amplifiers and controls which could be used and which are well known to those skilled in the art Therefore, a detailed description of the power amplifier and power control is omitted.

The hand-held terminal 10 includes power limiting logic to effectively limit the transmit power to a predetermined maximum hand-held power level when used as a hand-held device. In the preferred embodiment of the invention, the maximum hand-held power level is less than the maximum power level for Class 2 devices. More specifically, in the preferred embodiment the MAC corresponding power level 0 and power level 1 is revised downward when the mobile terminal 10 is used as a hand-held device to artificially limit the maximum transmit power. For example, when the MAC is equal to 000 or 001, it is changed to 010. As shown in Table 1, this limits the transmit power of the mobile terminal to −2 dbW. Where the mobile terminal 10 is inserted into a cradle of a vehicle or attached to a docking station having an external power source, the power level is adjusted according to the MAC for all values. Thus, for Class 2 devices, the mobile terminal 10 would have a maximum transmit power of 2 dbW when docked to a cradle or other docking station.

Figure 2:
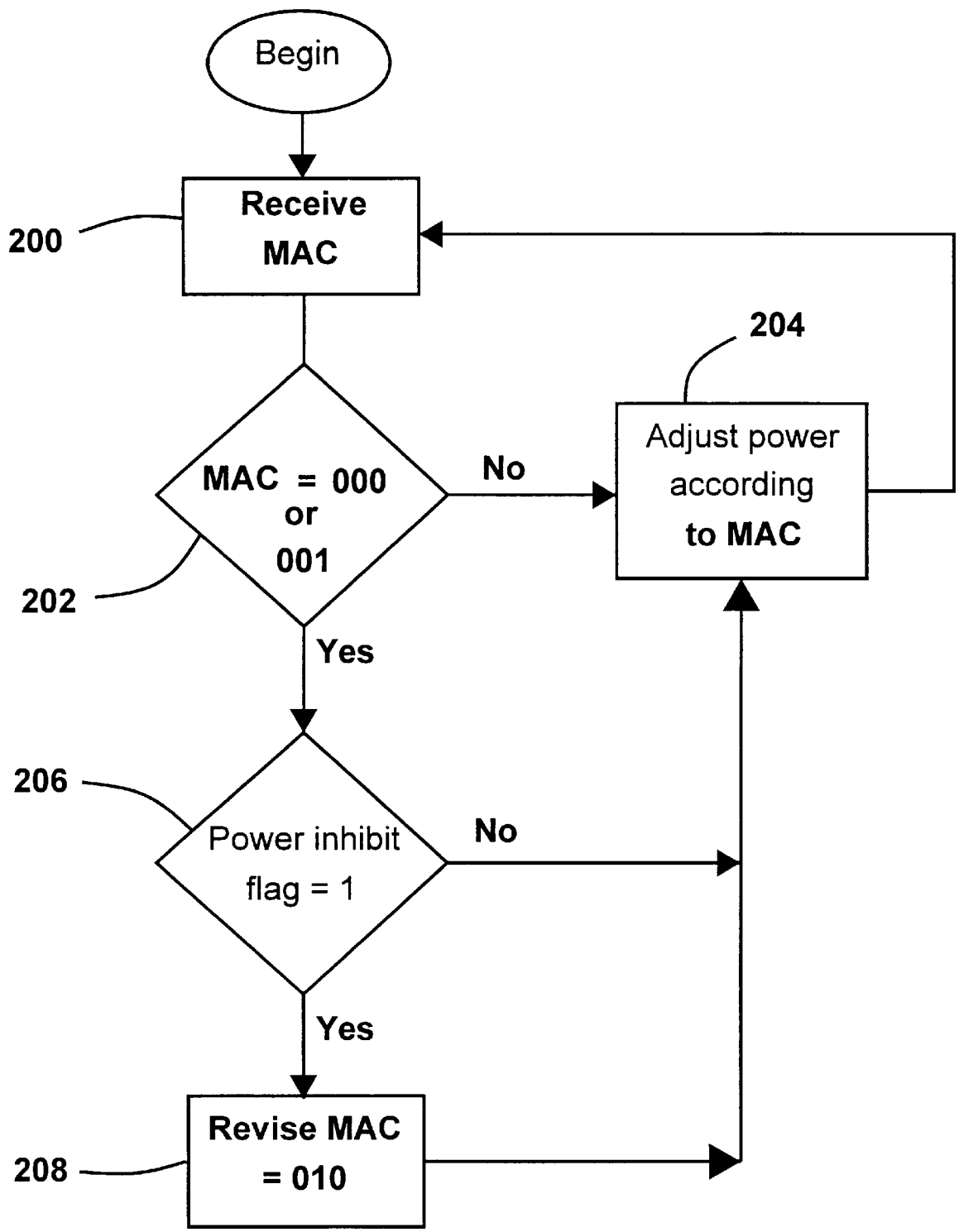
FIG. 2 is a flow diagram of the power control logic for the mobile terminal.

FIG. 2 is a flow diagram showing the power control logic used by the mobile terminal 10. The terminal 10 awaits receipt of a mobile attenuation code (MAC). Upon its receipt (block 200), the MAC is compared with values 000 and 001 (block 202), both of which correspond in the AMPS systems to the Class-2 RF power levels of +2 dbW (1.58 Watts). If the MAC has neither value 000 nor value 001, the power control logic adjusts power according to the MAC (block 204).

If the MAC has values 000 or 001, the power control logic checks the status of the power-inhibit flag (block 206), which indicates whether the terminal is operating as a hand-held device or as a captured device as explained below. If the power inhibit flag is set to zero, which indicates capture of the terminal by a docking station or cradle, the power control logic adjusts RF power according to the MAC(block 204). If the power-inhibit flag is set to one, which indicates hand-held use, the MAC is revised from 000 or 001 to 010 (block 208), and the power control logic adjusts power according to the revised MAC (block 204).

The power-inhibit flag is set as follows. In the preferred embodiment, the presence of a docking station (flag=0) is indicated by a data-communications clear-to send signal on the terminal's system bus. For this purpose, however, an equivalent signal can be provided by other recognized data-communication protocol signals, by a mechanical key indicating the terminal's capture by the docking station, by the disablement of the terminal's internal microphone, by the presence of an infrared link indicating the connection of the terminal with a portable or other computer, by means of an explicit signal communicated to the terminal through its system bus, or by any number of equivalent indicators. Capture by a vehicle's hands-free cradle (flag=0) is indicated in the preferred embodiment by the connection of an external antenna. For this purpose, however, an equivalent signal can be provided by other indicators such as a mechanical key indicating capture by a cradle, by the disablement of the terminal's internal speaker, by means of a signal communicated to the terminal through its system bus, or by any number of equivalent indicators. Hand-held status is indicated by the absence of any signal that the terminal has been captured by a docking station or cradle. In such case, the power inhibit flag is set equal to 1. Otherwise, the power inhibit flag is set equal to 0.

The power control logic can be modified to allow the user the option of selecting a power cap to be observed when the mobile terminal is operated in a hand-held mode. The user can interact with the mobile terminal 10 using the keypad 18 and display 20 to select a power cap. In a preferred embodiment, the user can select one of three power caps: A, B, and C. If option A is selected, the terminal's power is capped by limiting the MAC to 011, which corresponds to −6 dbW or approximately 0.250 Watts. If option B is selected, the terminal's power is capped by limiting the MAC to 100, which corresponds to −10 dbW or approximately 0.100 Watts. If option C is selected, the terminal's power is capped by limiting the MAC to 101, which corresponds to −14 dbW or approximately 0.040 Watts. If no option is selected, the hand-held power is limited to a default value of −2 dbW.

Figure 3A:
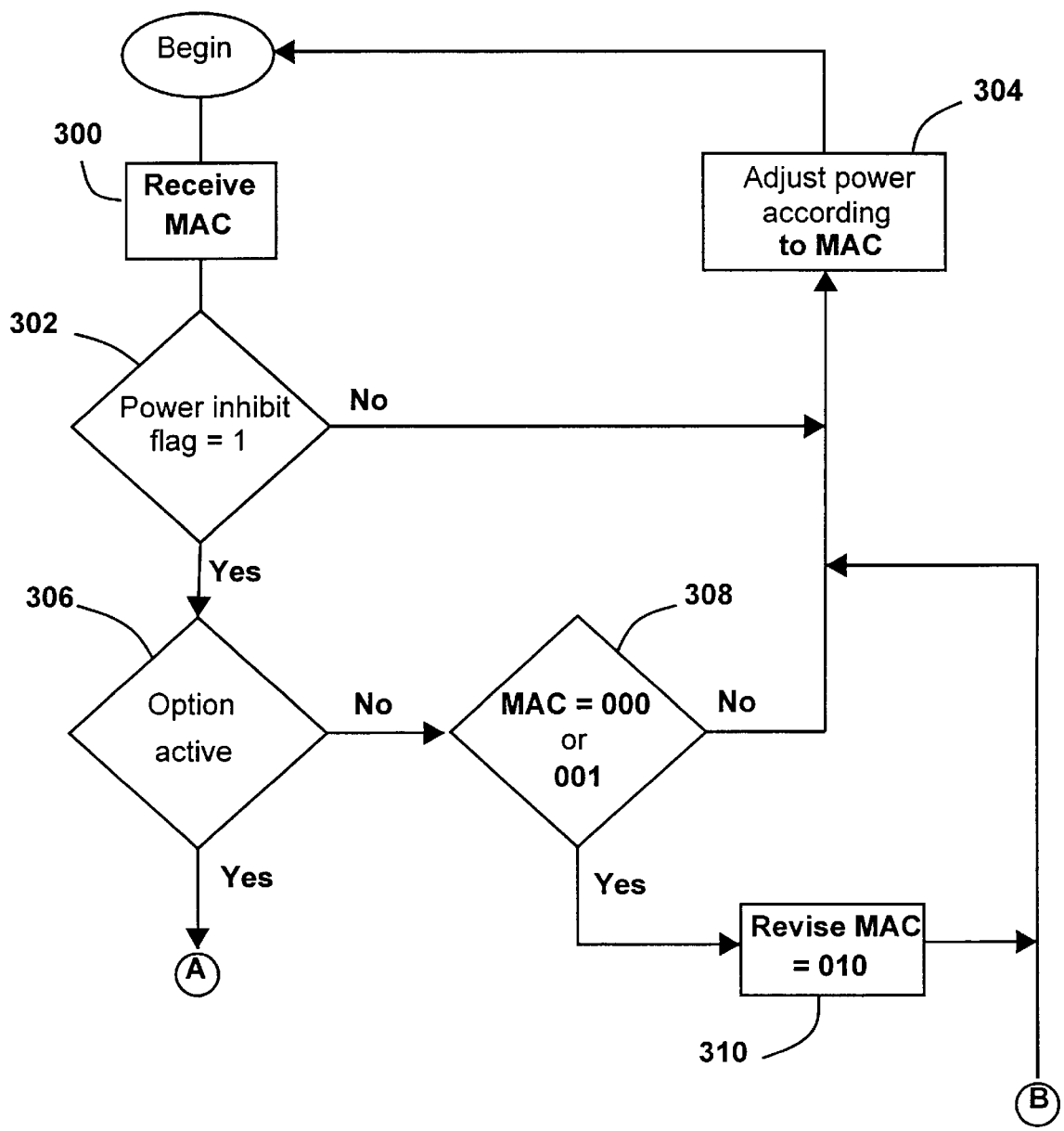
FIGS. 3A AND 3B are a flow diagram of the power control logic wherein the power cap is varied based on a selection by a user.
Figure 3B:
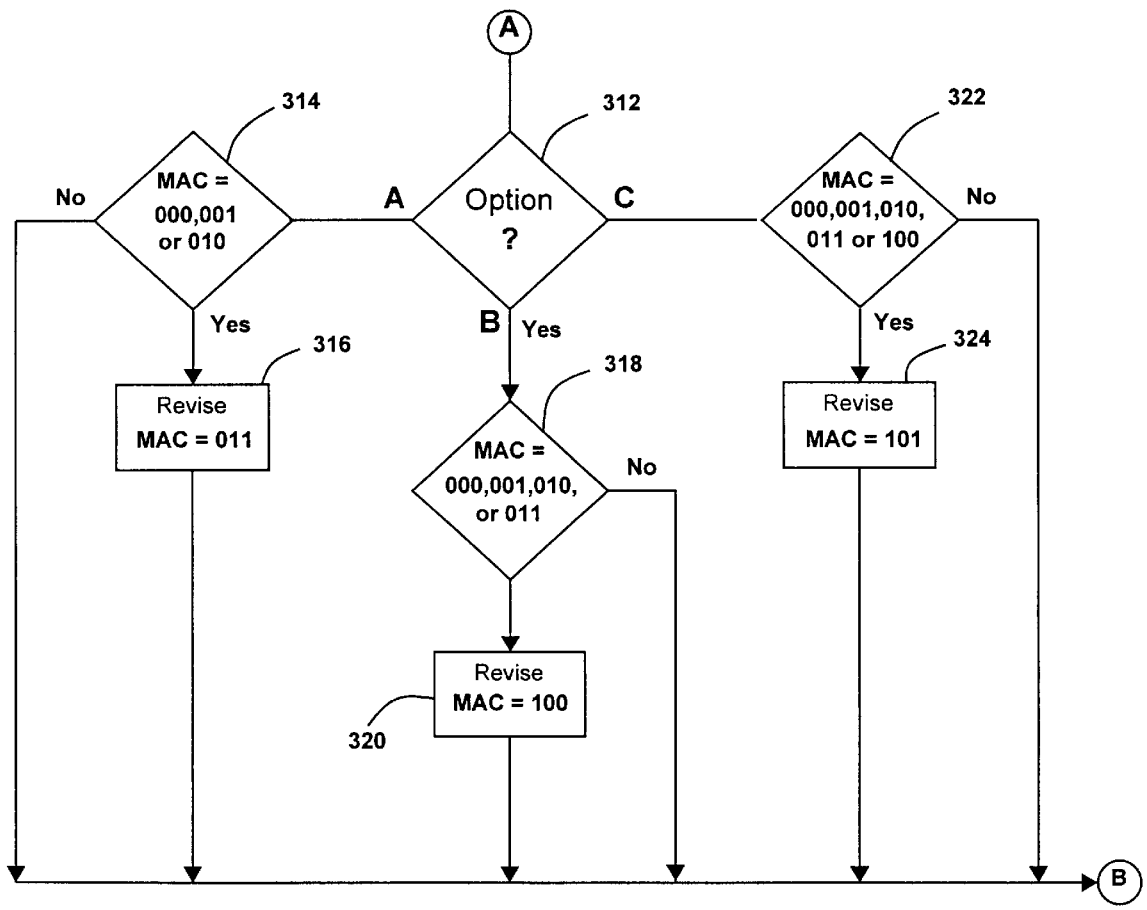

FIGS. 3A and 3B show the power control logic for a mobile terminal having a user-selectable power cap. The terminal waits for a MAC from the base station. When a MAC is received (block 300), the mobile terminal 10 checks the power inhibit flag (block 302). If the power inhibit flag is off (=0), the power level is adjusted according to the MAC (block 304). Otherwise the mobile terminal 10 determines whether the user has activated a power cap (block 306). If the power limit option is not selected, the mobile terminal checks the value of the MAC (block 308) and revises the MAC if it has a value of 000 or 001 (block 310). If the MAC has a value other than 000 or 001, then the power level is adjusted according to the MAC (block 304).

If the power limit option is activated, the mobile terminal 10 determines the option selected (block 312) and then the program flow branches depending upon which option is selected. After determining the option selected, the mobile terminal 10 checks the value of the MAC (blocks 314, 318, 322). The MAC is revised for specified values (blocks 316, 320, 324) and otherwise remains unchanged. The mobile terminal 10 then adjusts the power level according to the MAC (block 304).

In another embodiment (FIGS. 4A and 4B), the basic process of FIG. 3 is adapted to optionally cap power according to the state of charge of the terminal's battery. Again, the user interacts through a menu to activate or deactivate this option. In this case, however, the further selection of option A, B, or C is automatically coupled to a battery-charge indicator, for example to the six-state indicator provided by the Ericsson AH-310 cellular telephone terminal. In the illustrative example shown in FIG. 4, battery states B5 and B4 are logically coupled to power option A, battery states B3 and B2 are coupled to power option B, and battery states B1 and B0 are coupled to power option C.

Figure 4A:
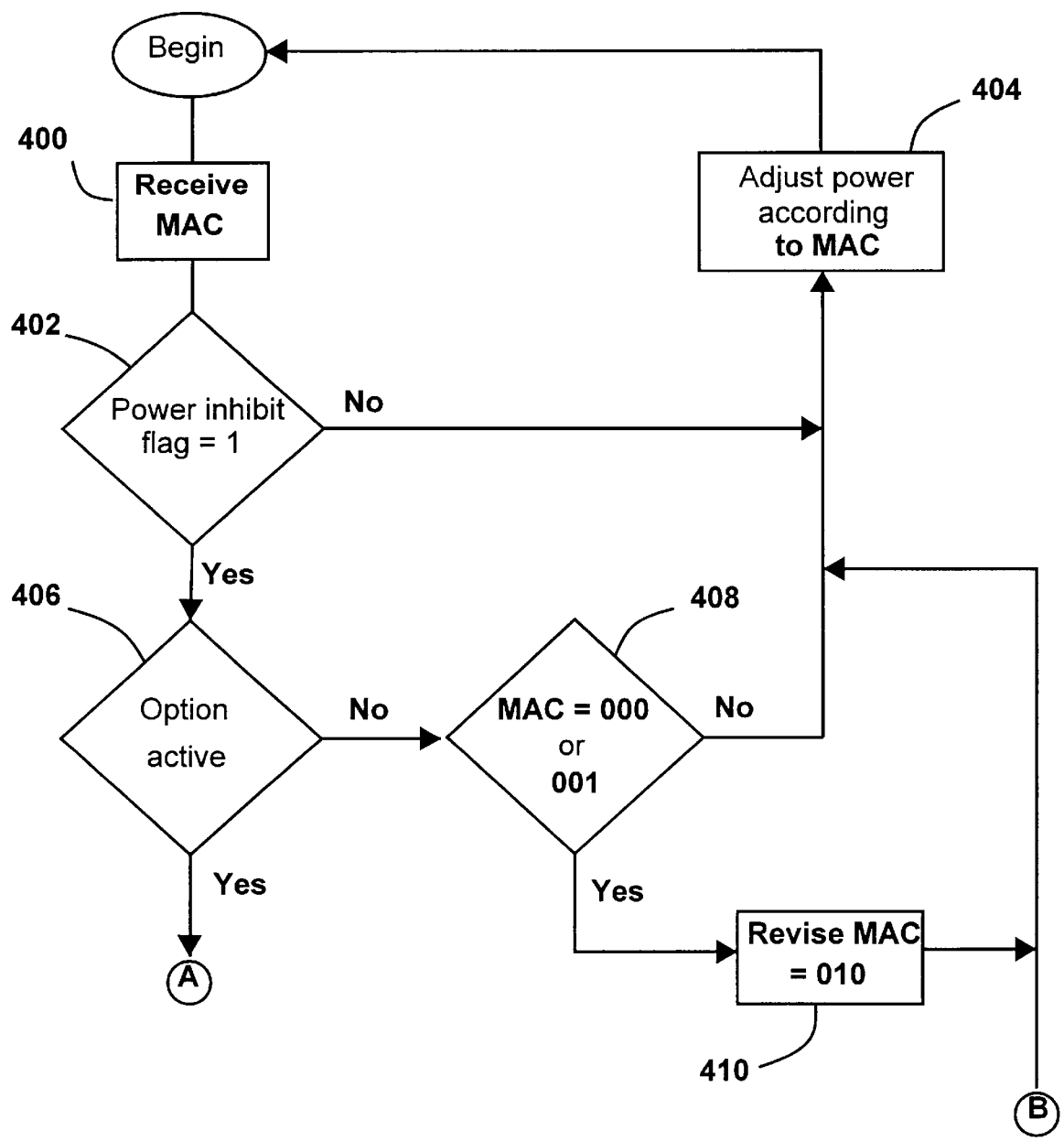
FIGS. 4A AND 4B are a flow diagram of the power control logic wherein the power cap is varied based on the state of the battery.
Figure 4B:
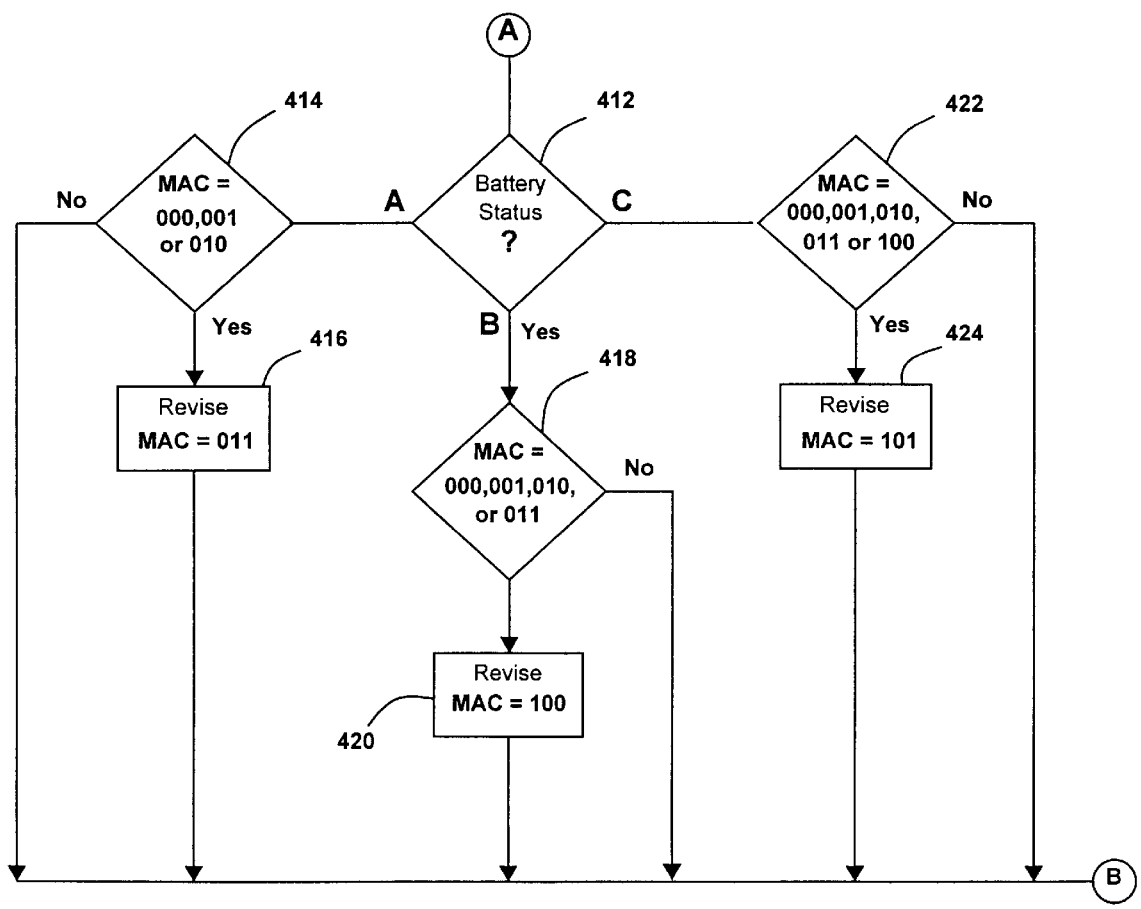

FIGS. 4A and 4B show the power control logic for a mobile terminal having a power cap logically coupled to the terminal's battery state. The terminal waits for a MAC from the base station. When a MAC is received (block 400), the mobile terminal 10 checks the power inhibit flag (block 402). If the power inhibit flag is off (=0), the power level is adjusted according to the MAC (block 404). Otherwise the mobile terminal 10 determines whether the user has activated a power cap (block 406). If the power limit option is not activated, the mobile terminal checks the value of the MAC (block 408) and revises the MAC if it has a value of 000 or 001 (block 410). If the MAC has a value other than 000 or 001, then the power level is adjusted according to the MAC (block 404).

If the power limit option is activated, the mobile terminal 10 determines the state of the battery (block 412) and then checks the value ofthe MAC (blocks 414,418,422). The MAC is revised for specified values (blocks 416, 420, 424) and otherwise remains unchanged. The mobile terminal 10 then adjusts the power level according to the MAC (lock 404).

What is claimed is:

1. A method for controlling the transmit power in a radio mobile terminal having a power class rating comprising:

a) establishing a plurality of power levels including a maximum transmit power level and a plurality of lower power levels;

b) establishing a maximum hand-held power level which is less than said maximum transmit power level for the present power class rating of the mobile terminal;

c) receiving a power command transmitted from a remote location at said mobile terminal, wherein said power command designates one of said power levels to use during transmissions;

d) generating a mode signal indicating whether the mobile terminal is operating in a hand-held mode;

e) transmitting at the power level designated by said power command when the mode signal indicates that the mobile terminal is not in a hand-held mode;

f) transmitting at the designated power level when the mode signal indicates that the mobile terminal is in the hand-held mode and the designated power level is less than or equal to the maximum hand-held power level; and g) transmitting at the maximum hand-held power level when the mode signal indicates that the mobile terminal is in the hand-held mode and the designated power level is greater than the maximum hand-held power level without changing the power class rating.

2. The power control method of claim 1 further including the step of selecting said maximum hand-held power level by a user, and storing said selection in said mobile terminal.

3. The power control method of claim 1 further including the step of setting the maximum hand-held power level based on the state of a battery used to power said mobile terminal when operating in the hand-held mode.

4. In a radio mobile terminal having a power class rating which adjusts its transmit power level according to power control codes transmitted to the mobile terminal from a base station, a method for limiting transmit power when the mobile terminal is operated in a hand-held mode said method comprising:

a) generating a mode signal indicating whether the mobile terminal is operating in the hand-held mode;

b) receiving said power control codes from said base station indicating one of a plurality of power levels;

c) revising the power control code to indicate a maximum hand-held power level when the mobile terminal is in the hand-held mode and the power control code designates a power level greater than said maximum hand-held power level; and d) transmitting a signal at a power level indicated by said revised power control code when the received power control code is greater than said maximum hand-held power level and said mobile terminal is in the hand-held mode without changing the power class rating.

5. The power control method of claim 4 further including the step of selecting said maximum hand-held power level by a user, and storing said selection in said mobile terminal.

6. The power control method according to claim 4 further including the step of setting the maximum hand-held power level based on the state of a battery used to power said mobile terminal when operating in the hand-held mode.

7. A mobile terminal which sets its transmit power level based on a power control code received from a base station, said mobile terminal comprising:

a) a transmitter;

b) a power amplifier coupled to said transmitter to produce an output signal at one of a plurality of power levels; wherein said power levels include a maximum transmit power level and a plurality of lower power levels;

c) means for generating a mode signal indicating whether said mobile terminal is operating in a hand-held mode;

d) power control logic coupled to said power amplifier and responsive to said power control code and said mode signal for varying the transmit power level of said mobile terminal without changing the power class rating, said power control logic being operative to set the transmit power level at a maximum hand-held transmit power level which is less than the maximum transmit power level for the present power class rating of said mobile terminal when (1) the mode signal indicates that the mobile terminal is in the hand-held mode, and (2) the power control code designates a power level greater than said maximum hand-held power level.

8. The mobile terminal according to claim 7 further including input means to enable a user to input said maximum hand-held power level, and storage means to store said maximum hand-held power level.

9. The mobile terminal according to claim 7 further including a battery charge indicator, said power control means being responsive to said battery charge indicator to vary the maximum hand-held power level.

* * * * *